N. A. DEAVER.
MACHINE FOR FILING AND GUMMING GIN SAWS.
APPLICATION FILED SEPT. 4, 1917.
1,277,555.
Patented Sept. 3, 1918.
4 SHEETS—SHEET 3.
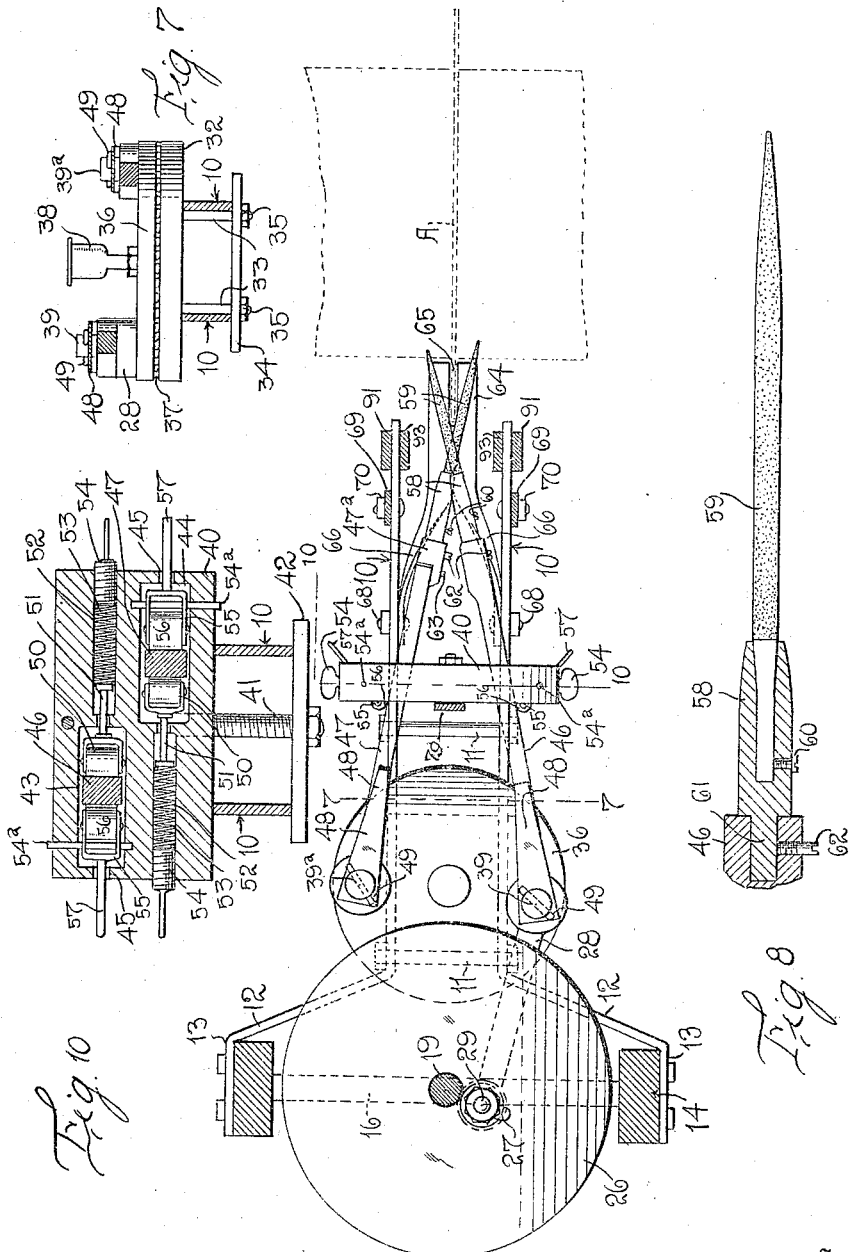
Inventor
N. A. Deaver
By Watson E. Coleman
Attorney

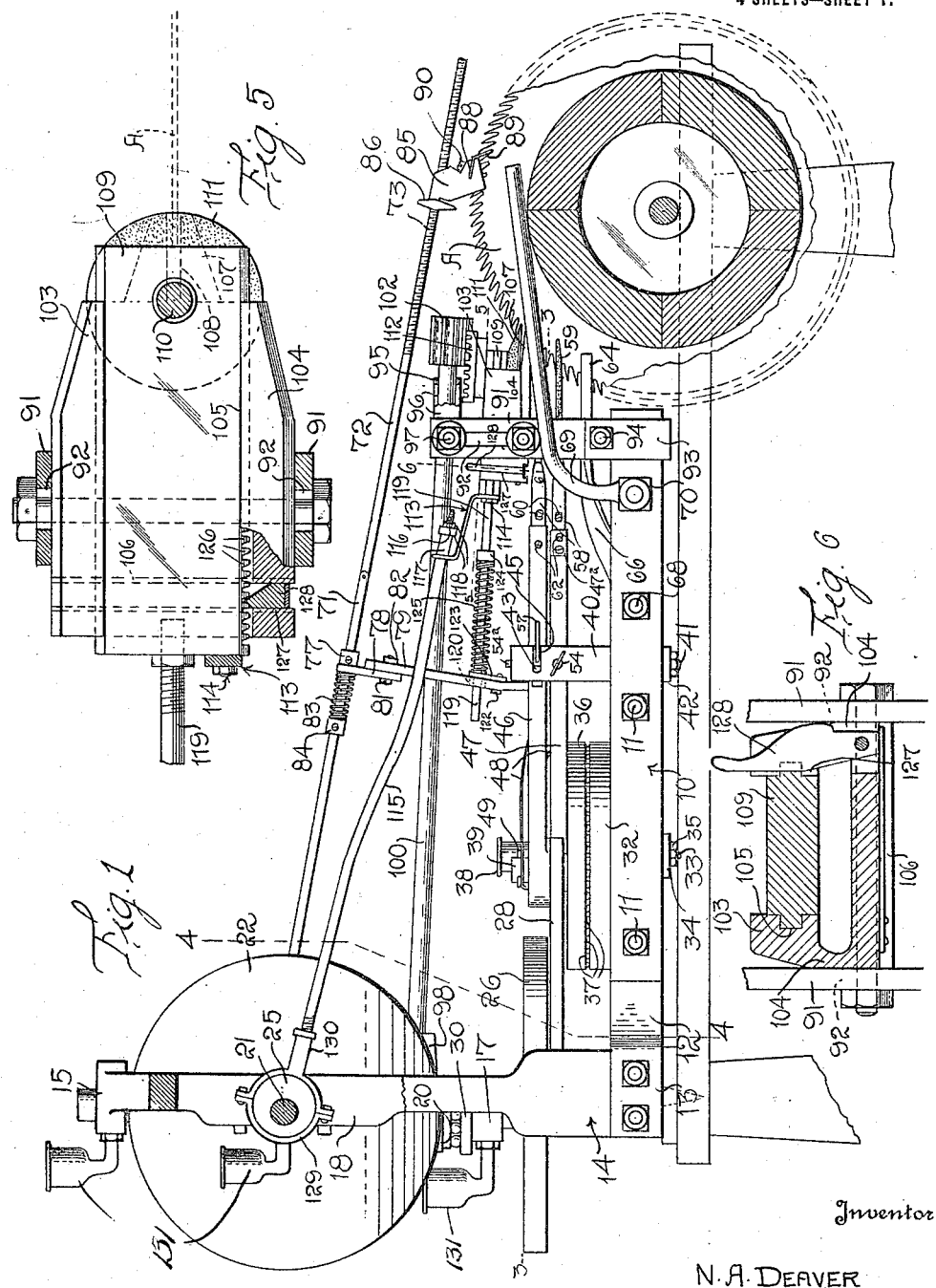

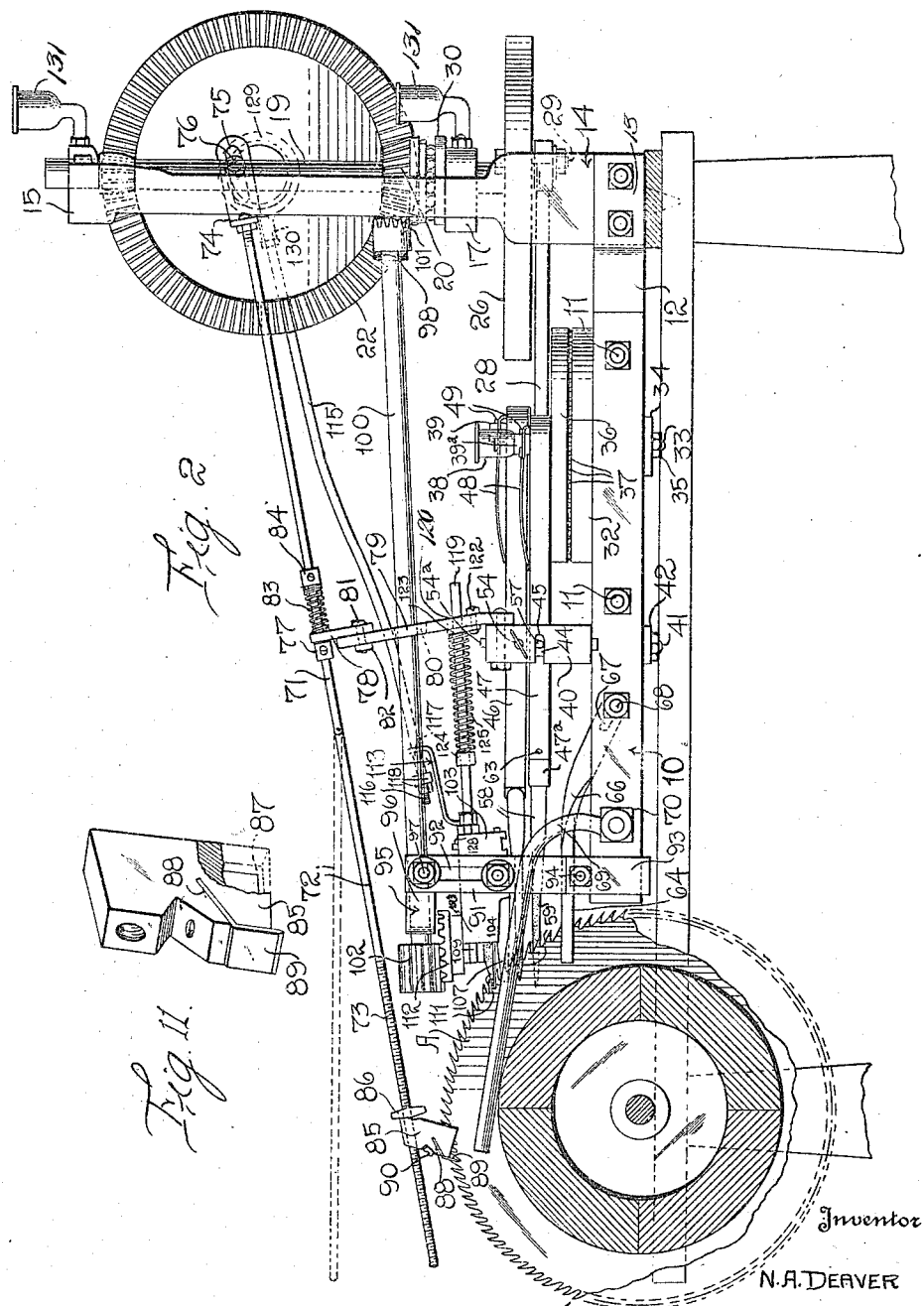

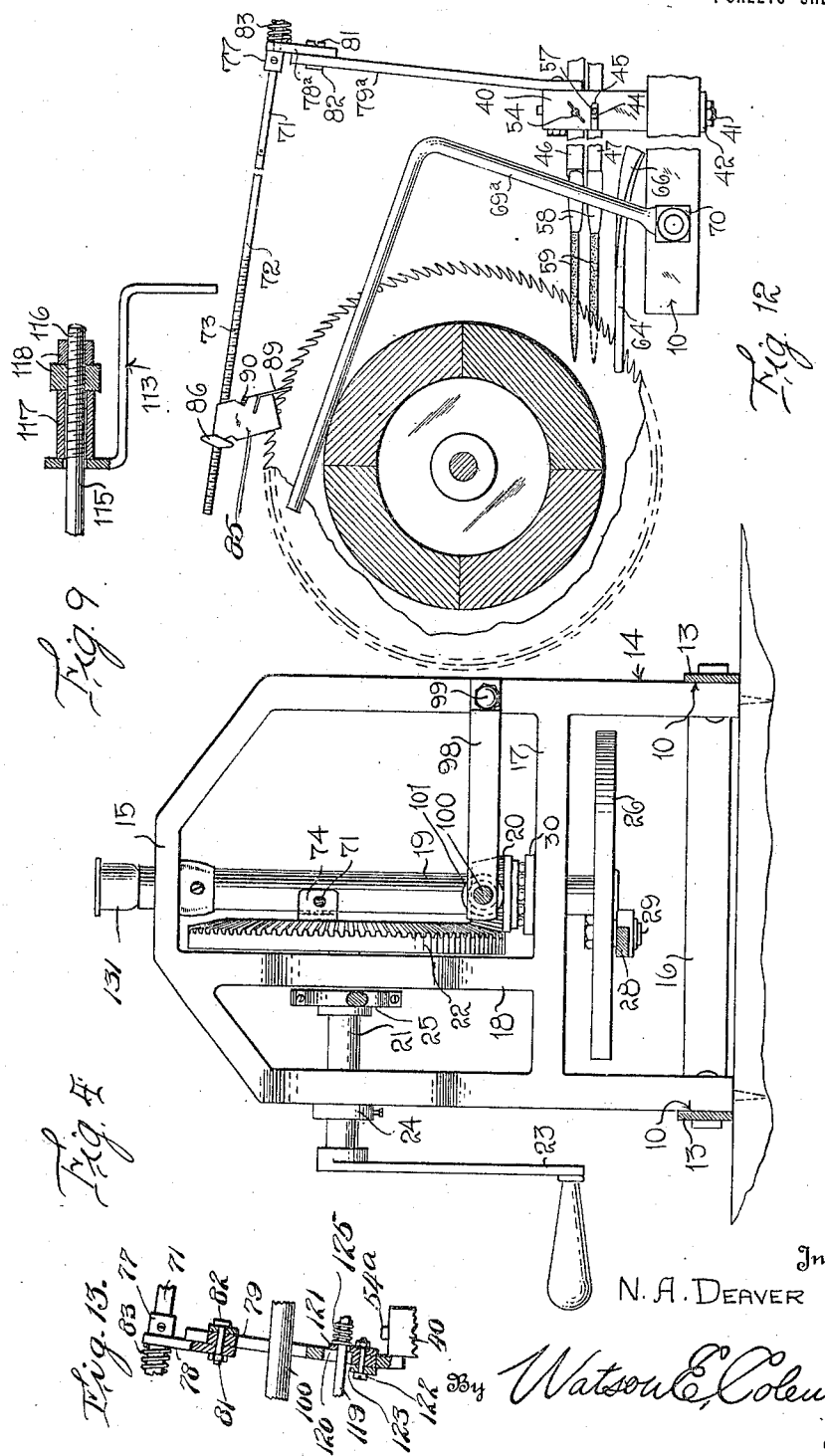

UNITED STATES PATENT OFFICE.

NATHAN A. DEAVER, OF PLUMERVILLE, ARKANSAS.

MACHINE FOR FILING AND GUMMING GIN-SAWS.

1,277,555.　　　　　Specification of Letters Patent.　　Patented Sept. 3, 1918.

Application filed September 4, 1917. Serial No. 189,597.

*To all whom it may concern:*

Be it known that I, NATHAN A. DEAVER, a citizen of the United States, residing at Plumerville, in the county of Conway and State of Arkansas, have invented certain new and useful Improvements in Machines for Filing and Gumming Gin-Saws, of which the following is a specification, reference being had to the accompanying drawings.

This invention relates to saw filing machines, and particularly to means for filing and gumming the saws of cotton gins.

The general object of my invention is to provide means for simultaneously filing and gumming the saws of cotton gins, or provide means which may be used either to gum the saw or file the saw teeth.

Another general object is to provide a machine of this character which may be set up opposite the gin itself, without removing the saws, and file and gum the saws *in situ*, or which may be used by removing the saw cylinder from the stand and placing it on trestles or other supports and in proper coactive relation to the machine.

A further object is to provide a machine of this character with improved means for giving a step by step motion to the saw being filed, so as to bring the teeth successively into contact with the gumming or filing means, this feed controlling means being capable of adjustment for fine toothed or coarse toothed saws.

A further object is to provide saw supporting means which will hold the saws against the pressure of the files and prevent any lateral yielding movement of the margin of the saw.

Another object is to provide oppositely disposed files which are crossed with relation to each other and to the plane of the saw blade, whereby the files will operate on opposite edges of the saw teeth.

Still another object is to provide means whereby the pitch of the files and therefore the pitch of the saw teeth may be regulated.

A further object is to provide improved means for regulating the pitch of the gumming file and regulating the extent of movement of the gumming file to thereby regulate the depth of the teeth.

Still another object is to provide means for controlling the extent of reciprocation of the files.

Other objects are to improve the details of construction of machines of this character, and to provide a construction which is relatively simple and in which the parts are easily adjusted.

Other objects will appear in the course of the following description.

My invention is illustrated in the accompanying drawings, wherein:—

Figure 1 is a side elevation of my gin saw filing mechanism, the cylinders of the saw being shown in section;

Fig. 2 is a like view to Fig. 1, but looking from the opposite side;

Fig. 3 is a fragmentary sectional view of the construction illustrated in Figs. 1 and 2, taken on the line 3—3 of Fig. 1;

Fig. 4 is a sectional view on the line 4—4 of Fig. 1;

Fig. 5 is a top plan view of the guide for the gumming file slide and of the slide itself, and showing the supports therefor in section on the line 5—5 of Fig. 1; the guide being partly broken away;

Fig. 6 is a vertical sectional view on the line 6—6 of Fig. 1;

Fig. 7 is a fragmentary transverse sectional view on the line 7—7 of Fig. 3;

Fig. 8 is a fragmentary longitudinal sectional view through one of the file sockets and the adjacent end of the file supporting arm, the file being in elevation;

Fig. 9 is a fragmentary enlarged sectional view through the bracket 113 and the parts 117 and 118;

Fig. 10 is a transverse sectional view on the line 10—10 of Fig. 3;

Fig. 11 is a perspective view of the feed block partly broken away; and

Fig. 12 is a fragmentary elevation of the forward end of the machine showing a different application of the machine to the saw;

Fig. 13 is a fragmentary longitudinal sectional view of the support 79 and allied parts.

As illustrated in the accompanying drawings, it will be seen that my machine includes a supporting frame comprising the side bars 10, which are disposed with the greater portion of their length in parallel relation to each other, and braced at intervals by bolts 11 having nuts thereon holding the side bars 10 in spaced parallel relation. At one end these side bars 10 are laterally bent as at 12 and then longitudinally extended, as at 13, and disposed between these portions 13 and extending vertically upward is a vertically disposed frame 14 comprising oppositely disposed side bars connected at their upper ends by an integral yoke 15, and connected by cross bars 16 and 17. The cross bar 17 is connected to the yoke 15 by a vertical integral bar 18. This frame is made of relatively heavy material and is bolted to the portions 13 so that the frame formed by the bars 10 and the part 14 is firmly connected.

Extending vertically downward through the bar 17 and the yoke 15, and mounted in suitable bearings is a shaft 19 which carries upon it the beveled gear wheel 20 and passing through one side bar of the frame 14 and through the bar 18 is a driving shaft 21, which carries upon it the relatively large beveled gear wheel 22 and also carries a crank 23, or other means whereby the shaft 21 may be driven. Preferably it will be driven by hand. A collar 24 fits upon the shaft 21 and is held thereto by a set screw, and bears against the side bar of the frame. This shaft 21 carries upon it an eccentric 25 and the lower end of the shaft 19 carries upon it the fly wheel or disk 26, having a radially extending slot 27. A connecting rod 28 has a bolt 29 which passes through this slot 27 and thus the inner end of the connecting rod may be adjusted nearer to or farther from the axis of the disk 26 to thereby adjust the throw of the connecting rod. The shaft 19 carries a collar 30, having a ball race and constituting one member of an anti-friction bearing, the bar 17 constituting the other member of said bearing and being formed with a ball race, there being anti-friction rollers, balls or other elements disposed between the collar 30 and the race on the bar 17. It will be obvious now that a rotation of the shaft 21 will cause a rotation of the disk 26.

Mounted upon the longitudinal bars 10, adjacent the frame 14, is a supporting disk 32, this disk being provided with a ball race on its upper face and being held firmly clamped upon the bars 10 by means of stud bolts 33 extending down from the disk 32 and passing through a transverse bar 34 and having nuts 35 engaging said bar.

Rotatably mounted upon the disk 32 is a disk 36 which is formed on its under face with a ball race. Anti-friction balls 37 are disposed between the disks 33 and 36, and the shaft of the disk 36 is provided with an oil cup 38. Extending upward from the disk 36 is a wrist pin 39 to which one end of the connecting rod 28 is engaged, and extending up from a diametrically opposite portion of the disk 36 is a like pin 39ª, less in height than the pin 39. Mounted upon the bars 10 in advance of the disks 32 and 36 is a transversely extending block 40, by which the file arms are guided, as will be later described, this block 40 being held in adjusted position upon the members 10 by means of a bolt 41 extending below the bars 10 and engaging a cross bar 42. By this means the block 40 may be firmly clamped upon the bars 10 and held firmly in adjusted position. This block 40 is formed with two longitudinally extending guide slots 43 and 44, the slot 43 being disposed above the slot 44 and being on the same side of the machine, as the wrist pin 39. Each of these slots extends from about the middle of the block 40 toward the end of the block, and the end of the block which forms the outer wall of each slot is inwardly cut or slotted as at 45.

Disposed in these slots 43 and 44 are the file carrying arms 46 and 47. These arms are square in cross section and the arm 46 extends rearward and is perforated at its rear end for the passage of the wrist pin 39, the arm 46 being disposed on the upper face of the adjacent end of the connecting rod 28. The arm 47 is disposed in a plane below the arm 46 and extends rearward and is pivotally connected to the disk 36 by means of the wrist pin 39ª. Curved leaf springs 48 are mounted upon the wrist pins and held in place by cotter pins 49, the extremities of these springs bearing upon the upper faces of the arms 46 and 47 and exerting a downward pressure on these arms. Coacting with the arm 46 is a roller 50, this roller being carried by a stem 51 passing through a bore 52 in the slide; and there is a spring 53 for forcing this stem inward and therefore forcing the roller inward, that is, toward an arm 46. The tension of this spring may be adjusted by means of a screw 54, the stem of this screw being cup-shaped to engage over the end of the spring. By adjusting this screw inward or outward the tension of the spring 53 may be adjusted and, therefore, the pressure exerted against the file arm may be adjusted. The file arm 47 is urged in a reverse direction to the file arm 46 by means of a like roller 50 having a stem 51 engaged by a spring 53 in turn engaged by an adjusting screw 54, this adjusting screw 54 for the file arm 47 being of course disposed on the opposite end face to the screw which will adjust the tension of the spring for the first named roller.

It will be noted from Fig. 3 that these file arms are disposed in convergent relation so that the files carried thereby will intersect or cross each other, and it will be further seen from the drawings that the saw is disposed between the files outward of the intersection of these files and, therefore, that the springs 53 act to force the files against the side faces of the saw teeth. For the purpose of forcing the file arms inward against the tension of the springs 53 and holding them in this inwardly shifted position so as to carry the files out of operative engagement with the saw, I provide in each slot 43 a pivot pin 54ª and rotatably mount upon this pin a yoke 55 carrying a roller 56, this yoke being provided with an outwardly extending arm 57. When the roller 56 is turned into engagement with the corresponding file supporting arm, the pin 57 which constitutes a handle will be turned out through the slot 45 (see Fig. 10). When the file arm is to be released, however, the roller will be turned out of engagement with the file arm and the handle 57 will be turned parallel to the file arm, as in Fig. 3. I can thus readily shift the file arms into or out of engagement with the saw teeth and hold them out of engagement with the saw teeth when the file is being adjusted on a saw.

Mounted on each of the arms 46 and 47 is a file holder designated 58, this file holder having a socket for the shank of the file 59 and being provided with a set screw 60 to engage the shank and hold it in place. One or more of these set screws may be used. The extremity of each file holder is formed with a tang 61 which is insertible in a socket in the corresponding file arm and is held in place by a set screw 62. Thus the file holders 58 may be rotatably adjusted to bring any desired edge of the three-cornered file 59 into engagement with the saw tooth or to change the angle of the faces of the file with relation to the saw teeth.

The file arm 47 is formed in two sections 47 and 47ª. The section 47ª is pivoted to the section 47 by means of a bolt or screw 63, which when turned inward holds the section 47ª in vertically adjusted relation to the main body of the arm. The purpose of this is to adjust the file carried by the arm 47 to suit saws having fine or coarse teeth, the arm 46 operating the file which cuts the outer or upper edge face of the tooth, while the file carried by the arm 47 cuts the inner or lower edge face. The file carried by the arm 46 is, therefore, approximately horizontal as to its plane of reciprocation, but if the tooth be a coarse one, the angle of the upper edge will be greater than if the tooth be a fine one and, therefore, it is necessary to adjust the file carried by the arm 47 to suit this difference in angle.

For the purpose of holding the saw from lateral movement while it is being filed, I provide the saw guide designated generally 64, which comprises a forwardly tapered plate formed with a medially disposed kerf 65 which receives the saw, the rear end of this plate being formed with laterally and downwardly extending arms 66, these arms at their extremities being longitudinally slotted as at 67. Bolts 68, provided with suitable nuts, pass through the side bars 10 and through these slots and hold the saw guides in adjusted positions. By this means the saw guide may be adjusted forward or rearward to suit varying conditions. Also mounted upon the forward ends of the side bars 10 are the supporting arms or braces 69. These are angularly bent so that the rear end of each arm extends downwardly and is connected to the corresponding bar 10 by means of a bolt and nut 70. Thus these arms may be adjusted. I also provide another pair of these arms 69, one of which I have illustrated in Fig. 12, and which is designated 69ª, which is also angular in form, but extends higher above the bar 10 than do the braces 69 and is used for a slightly different purpose as will hereafter appear.

For the purpose of feeding the saw A step by step I provide a reciprocating rod 71, which is made in two sections, the section 72 being pivotally or hingedly connected to the other section of the rod for movement in a vertical plane and this section 72 being screw-threaded as at 73. The rear end of the rod is screw-threaded and is engaged with an angular plate 74, which is longitudinally slotted as at 75, and a wrist pin 76 carried by the driving beveled gear wheel 22 passes loosely through the slot 75, this wrist pin 76 being disposed very close to the center of movement of the beveled gear wheel 22, so that a comparatively short reciprocation is given to the rod. The amount of this reciprocation is controlled by a collar 77 adjustably mounted upon the rod 71. The rod 71 passes through a guide plate 78, in turn mounted upon a vertically extending support 79, which extends downward and is bolted to the guide 40. This support 79 is in one form longitudinally slotted as at 80 and also acts as a means for supporting and angularly adjusting the gumming file as will be later described. The plate 78 is held to the support 79 by means of a screw 81 engaging with a transversely extending clamp bar 82. The collar 77 will strike against the plate 78 and thus limit the inward movement of the rod 71 under the action of a spring 83, which extends around the rod 71, bears at one end against the plate 78 and at the other end bears against a collar 84, which is held to the rod 71 by means of a set screw.

The rotation of the gear wheel 22 acting upon the plate 74, which practically constitutes a Scotch yoke, acts to shift the rod 71 forward and the rearward movement of the rod is limited by the adjustment of the collar 77. Thus in one position of the collar the rod will only move rearward a relatively short distance, that is, a distance equivalent to a fine tooth and in another position of the collar the rod 71 will move rearward a greater distance equal to the width of a larger tooth.

Mounted upon the screw-threaded extremity 73 of the rod 71 is an adjustable block 85 which may be adjusted up and down the rod by rotating it thereon, and which may be held in its adjusted position by means of a lock nut 86. The block 85 constitutes a pawl and is longitudinally slotted as at 87 to straddle the saw A and is also formed with a kerf 88 for the reception of a blade 89, which is angular in form and constitutes the pawl tooth proper and is engageable with the teeth of the saw, this blade being held in place by means of a set screw 90. By providing for the longitudinal adjustment of the member 85 on the rod section 72, the pawl may be arranged to engage either coarser or finer teeth and to drop into engagement with the interdental spaces at all times.

For the purpose of "gumming" the saw, that is cutting the interdental spaces, I provide a rotatable gumming file disposed in a plane tangential to the saw, constantly rotated and intermittently shiftable into engagement with the saw teeth. To this end I mount upon the forward ends of the bars 10 the upright standards 91, which are formed of flat bars, longitudinally slotted for a portion of their length as at 92, the lower end of each bar being upwardly turned as at 93 to embrace the forward end of the corresponding bar 10 and be clamped thereto by the bolt 94. Adjustably mounted upon the upper ends of these standards 91 is the cross bar 95 which constitutes a shaft rest, the ends of the cross bar being rearwardly turned as at 96 and engaged with the standard 91 by means of bolts 97 passing through the slot 92.

Mounted upon the frame 14 is a supporting bracket 98 which is held to the standard 14 by means of the bolt 99, and rotatably mounted in this bracket 98 and in the supporting member 95 is a shaft 100. This shaft carries upon its rear end a crown gear wheel 101 which meshes with the beveled gear wheel 20. The forward end of this shaft carries upon it a longitudinally elongated toothed gear wheel 102.

Mounted upon the standards 91 is a head block 103, formed with side walls 104, each side wall being formed adjacent its upper edge with a groove 105 and adjacent the bottom of the head block with a lateral recess 106. The bottom wall of the head block is forwardly prolonged as at 107 and this prolongation is formed with a longitudinally extending kerf 108 to receive the saw blade. Slidingly mounted in this head block 103 is a file carrying slide 109, which is formed with lateral ribs engaging in the grooves 105 and at its forward end this slide 109 carries a vertically disposed shaft 110, to which is detachably engaged the rotatable file 111. This file, as illustrated in Fig. 5, is circular in form and beveled downward and outward to a thin edge. Carried upon the upper end of the shaft 110 is a crown gear 112, which engages with the gear wheel 102 and is driven thereby. It will be obvious, therefore, that a rotation of the shaft 100 will give a continuous rotation in one direction to the gummer file 111.

For the purpose of retracting the slide I attach to the rear end thereof a strip of metal, designated 113, which is longitudinally extended and inclined slightly upward and rearward, the forward end of this strip being downwardly bent and engaged with the rear end of the slide 109 by means of the screw 114. The rear end of this member 113 is upwardly bent and apertured for the passage of an eccentric rod 115. The eccentric rod at its forward end is screw-theaded as at 116 (see Fig. 9) and disposed against the member 113 is a loose sleeve 117 and holding this sleeve in place are the jam nuts 118. It will be seen that the rod 115 passes loosely through the member 113 and that the retraction of this rod will pull the slide rearward, but that upon a projection of the rod, the rod will move through the member 113 and not affect the slide.

For the purpose of urging the slide forward, I engage with the rear end of the slide, the rearwardly extending rod 119, the forward end of this rod resting in a recess in the rear end of the slide and the forward end of the rod being screw-threaded. The rear end of this rod passes through the slot 120 in the guiding member 79, which is attached to the block 40 as previously described, and mounted for adjustment in this slot is a guide 121 having a perforation for the passage of the rod 119, this guide being adjustably mounted upon the member 79 by means of a bolt 122 passing through the slot and engaging a transversely extending clamp 123. Disposed on the rod 119 is an adjustable nut 124 engaging the screw-threads of the rod and bearing against the guide 121 and this nut is a coiled spring 125. This coiled spring urges the rod forward and therefore urges the slide and the file carried thereby forward.

For the purpose of holding the slide 109 in a retracted position and the file therefor in a retracted position, so that the slide will not be acted upon by the eccentric rod, I form one side of the slide with the teeth 126 (see Fig. 5) and slot the head block 103 as at 127 and mounted in this slot the pivoted latch 128, the inner edge face of which is formed to engage the teeth 126. When this latch is released, the spring 125 will cause the projection of the slide and the file carried thereby and when the slide is forced rearward and the latch engaged with it, it will hold the file retracted.

The rear end of the eccentric rod 115 is connected to a two-part eccentric ring 129, one section of this eccentric ring being provided with an outwardly extending nipple 130, with which the rear end of the eccentric rod has screw-threaded engagement. This eccentric rod is curved downward and forward in the manner illustrated in Fig. 1. It is obvious that the stroke of this eccentric rod is relatively small. The several parts are designed to be lubricated by means of the cups 131, which may be engaged with the bearings in any suitable manner.

Under certain circumstances, the supporting guide 79 is removed and a slightly longer guide 79$^a$ is used, in place of the guide 79. The guide 79$^a$ is longitudinally slotted for the passage of the bolt or screw 81.

The general operation of this machine will be obvious to those skilled in the art. The machine is adapted to be used either with the saw and its cylinder or mandrel removed from the gin or may be used without removing the saw and its mandrel from the gin, but this machine does not require that the saws shall be removed from their mandrels in order to be filed and gummed. Assuming that the saw is properly positioned and the saw blade is inserted in the kerfs 65 and 108 with the feed block 85 properly adjusted and engaged with the teeth of the gin saw, then it will be obvious that upon a rotation of the shaft 21, through the medium of the crank handle, the disk 36 will be oscillated by means of the connecting rod 28. The degree of this oscillation is controlled by setting the wrist pin 29 nearer to or farther from the shaft 19 by means of adjusting this wrist pin in the slot 27 and thus the degree of reciprocation given to the files may be controlled. The springs 53 urge the file arms 46 and 47 outward so that the crossed files bear against opposite edges of the saw teeth and are, therefore, forced against the saw teeth by the pressure of the springs 53. This pressure may be adjusted by adjusting the screws 54. By shifting the rollers 56 in or out, the file arms may be adjusted out of or into operative relation to the saw. The oscillation given to the plate 36 reciprocates the file arms through the guide slots in block 40, and thus reciprocates the files. As the shaft 21 is rotated, the beveled gear wheel 22 is rotated and upon each rotation of the beveled gear wheel, the feed rod 71 with its pivoted section 72 will be forced forward a predetermined amount and upon the further rotation of the gear wheel 22, the spring 83 will force the rod 71 rearward an amount determined by the position of the collar 77. By adjusting this collar 77 and adjusting the feed block 85 on the rod section 72, the feed of the saw can be controlled so that it will be fed one tooth upon each complete rotation of the gear wheel 22. Of course the amount of forward movement given to the rod 71 will be determined by the size of the saw teeth. As soon as the saw has been fed forward one step, the eccentric shifts the eccentric rod 115 forward and the spring 125 forces the slide 109 forward to a degree determined by the adjustment of the set nuts 118. The file 111 is rotating while in contact with the teeth of the saw and cuts out the interdental spaces in a manner which will be obvious. The pitch of the teeth is determined by adjusting the head block 103 upward or downward in the slots 92, the gear 102 being adjusted to suit the adjustment of the head block by adjusting the cross bar 95. The pitch of the saw teeth may also be controlled and is primarily controlled by adjusting the supporting members 69, which bear upon the cylinder or mandrel of the saw. If these are depressed, so as to relatively elevate the files, the pitch will be increased and if the free ends of these supporting members are adjusted upward so as to lower the file relative to the saw, the files will be disposed in a more radial position and the pitch of the saw teeth will be decreased.

In order to release the files from the saw, the rollers 56 are turned inward by rotating the yokes 55 which force the files away from the saw blade. In order to disengage the gummer file 111 from the saw, the slide is retracted and the latch 128 is thrown into engagement with the teeth 126. The latch 128 also acts as means for controlling the feed of the file 111 as will be later explained. The files can be adjusted forward or rearward by loosening the set screw 62 on the file arms and adjusting the sockets 58 therein.

Some gin saws have coarse teeth and others have fine teeth and it is to provide for the proper adjustment of the files to suit either coarse or fine teeth that I provide the jointed section 47$^a$. By turning this section downward the inclination given to the corresponding file is increased so as to suit the increased angle of the under edge face of the saw. This adjustment, however, does not require to be over $\frac{1}{16}''$. This will suit the differences between coarse and fine teeth.

As before stated, this machine can be used either by taking the saw cylinder out of the stand, or the saws may be filed without taking the saw cylinder and saws out of the gin stand. In the first instance, the saw cylinder is taken out of the stand and placed on a pair of trestles, a 2 by 4 scantling is placed upon the ends of the trestles to support the machine, and the brace arms 69 rest on the saw cylinder. The saw that is intended to be filed, of course, is disposed within the slots 65 and 108. Then the machine is operated, as previously described.

If the operator wishes to file the gin saws without removing the saws from the stand, that is, removing the cylinder and the saws, the braces 69 and 91 are removed, together with the gumming mechanism and the shaft 100 and the support 95 therefor. The brace arms 69ª are used in place of the supporting or brace arms 69. These, as it will be seen from Fig. 12, have a longer vertical leg than the braces 69, which permits the files to engage the saw blade below its rotative axis instead of above the rotative axis, as is the case in the first instance, and also in this case the feed rest 79 is removed and the feed rest 79ª is put in its place. This is necessary in order to elevate the guide block 40 so as to engage the upper edge of the saw with the files engaging the saw below the rotative axis thereof. In this case also the feed block 85 must be removed from the section 72 and reversed, so that the feed block 85 will pull the saw blade, one tooth at a time, instead of pushing against the saw blade one tooth at a time.

The latch 128 operates automatically to cause the withdrawal of the gumming file 111 from its engagement with the saw. Thus, for instance, if it be desired to throw the gumming file out of operation, the latch 128 is thrown in. The teeth 126 are ratchet teeth, as illustrated in Fig. 5 and therefore upon each reverse movement of the slide 109 and the rod 115, the slide will be retracted one tooth or several teeth depending upon the rearward stroke of the slide and then the latch will spring into place behind the teeth, preventing the forward movement of the slide.

The advantages of this construction are many, as will be obvious from this description; but one of the main advantages resides in the fact that the filing of the teeth may be done without removing the individual saws from the mandrel or cylinder, and if necessary, without removing the cylinder and saws from the gin itself. Furthermore, all the parts are adjustable so that the pitch of the teeth may be adjusted, the stroke of the files may be adjusted, the depth of cut of the gumming file may be adjusted and that teeth may be formed having different widths and pitches. Furthermore the pressure exerted by the files on the saw may be controlled while the files are operating. The device is relatively simple, requires but little power, and can be readily transported from place to place.

While I have illustrated an embodiment of my invention which I have found to be thoroughly effective in actual practice, it will be understood that many changes may be made in the details of construction without departing from the spirit of the invention as defined in the appended claims.

Having described my invention, what I claim is:—

1. A circular saw filing machine including a supporting frame, a pair of file carrying arms, and means for reciprocating said file carrying arms including a lower fixed disk, the upper disk rotatably mounted upon the upper disk and having wrist pins operatively engaging the file carrying arms, ball bearings disposed between the disks, and power operated means for oscillating the upper disk.

2. A machine for filing circular saws including a supporting frame, a pair of converging file carrying arms, a guide through which the file carrying arms pass, said guide being longitudinally adjustable upon the frame, and means for reciprocating the file carrying arms in opposite directions.

3. A machine for filing circular saws including reciprocating file carrying arms normally disposed in convergent relation, files carried thereby and disposed in crossed relation to receive a saw between them, one of said file carrying arms being disposed in a plane above the other file carrying arm, and means whereby one of the files may be adjusted in a vertical plane into or out of angular relation to the corresponding file carrying arm.

4. A machine for filing circular saws including reciprocating file carrying arms normally disposed in convergent relation, files carried thereby disposed in crossed relation to receive a saw between them, one of said file carrying arms being disposed in a plane above the other file carrying arm, and one of said file carrying arms being formed in two sections angularly adjustable with relation to the other.

5. A circular saw filing machine including a supporting frame, a pair of converging file carrying arms, files carried by the arms and crossing each other, a fixed guide having slots through which the file carrying arms reciprocate, means for reciprocating said file carrying arms, and rollers disposed in said slots on each side of each arm, one of each pair of rollers being yieldingly forced against the arm.

6. A machine for filing circular saws including a supporting frame, a shaft carried upon one end of the frame, a horizontally disposed fly wheel carried by the shaft, means for rotating the shaft, a pair of reciprocating file carrying arms operatively connected to the fly wheel for oscillation thereby, a vertically disposed rotatable member, a saw embracing member having a pawl adapted to be disposed in engagement with the teeth of the saw, means on said rotatable member for causing a reciprocation of the saw engaging member, the saw engaging member being adjustable nearer to or farther from the rotatable member, and means for controlling the stroke of said saw engaging member.

7. A circular saw filing machine including a supporting frame, a pair of converging file carrying arms, files carried by the arms and crossing each other, a fixed guide having slots through which the arms pass, springs urging the arms away from each other to thereby urge the files toward each other, and means for reciprocating said file carrying arms, including a lower fixed disk, an upper disk rotatably mounted upon the lower disk and having wrist pins engaging the file carrying arms, and power operated means for oscillating the upper disk.

8. A circular saw filing machine including a supporting frame, a pair of converging file carrying arms, files carried by the arms and crossing each other, a fixed guide having slots through which the arms pass, springs urging the arms away from each other to thereby urge the files toward each other, and means for reciprocating said file carrying arms, including a lower fixed disk, an upper disk rotatably mounted upon the lower disk and having wrist pins engaging the file carrying arms, and power operated means for oscillating the upper disk, including a vertically disposed shaft, driving connections to said shaft, a horizontal fly wheel carried on said shaft and radially slotted, a bolt constituting a wrist pin passing through said slot and adjustable therein, and a connecting rod connecting said bolt to a wrist pin on the oscillatable disk.

9. A machine for filing circular saws including reciprocating file carrying arms disposed in convergent relation, files carried thereby and crossing each other, resilient means urging the file carrying arms away from each other and the files toward each other, means for regulating the pressure of said resilient means, and means whereby the file carrying arms may be forced toward each other and held in this position to shift the files out of engagement with the saw.

10. A machine for filing circular saws including reciprocating file carrying arms disposed in convergent relation, files carried thereby and disposed in cross relation, a guide block having slots through which said file carrying guides pass, springs mounted in the guide block and operatively engaging the file carrying arms to urge them away from each other, to thereby urge the files toward each other and against the saw, and means for regulating the pressure exerted by said springs.

11. A machine for filing circular saws including reciprocating file carrying arms normally disposed in convergent relation, files carried thereby and disposed in crossed relation to receive a saw between them, one of said file carrying arms being disposed in a plane above the other file carrying arm, a block having guide slots receiving the file carrying arms, and means whereby one of the files may be adjusted in a vertical plane into or out of angular relation to the corresponding file carrying arm.

12. A machine for filing circular saws including reciprocating file carrying arms normally disposed in convergent relation, files carried thereby and disposed in crossed relation to receive a saw between them, one of said file carrying arms being disposed in a plane above the other file carrying arm, a block having guide slots receiving the file carrying arms, one of said file carrying arms being formed in two sections, the section with which the file operatively engages being pivoted to the main section and being vertically adjustable with relation thereto, to thereby vary the vertical angle of the file.

13. A saw filing machine including a base frame and a vertically disposed frame at the rear end, a vertically disposed shaft mounted in the last named frame, a fly wheel carried on the lower end of said shaft, means for driving said shaft, a disk mounted upon the base frame and having a raceway, an oscillatable disk mounted on the first named disk and having a raceway, anti-friction elements disposed between said disks, wrist pins extending upward at diametrically opposite points of the upper disk, a connecting rod engaging one of said wrist pins and operatively engaging said fly wheel, a guide block mounted upon the base frame and extending upward therefrom and having slots disposed at different levels, file carrying arms pivoted to the wrist pins of the upper disks and passing each through one of said slots, the arms being disposed in convergent relation, file carrying sockets detachably mounted upon the ends of the arms, files mounted in the sockets and in crossed relation, a saw guide having a kerf to receive the saw disposed below said files, means yieldingly urging the file carrying arms away from each other to thereby urge the files toward the saw, and means for giving a step by step rotation to the saw being filed.

14. A machine for filing circular saws comprising a supporting frame, a horizontally disposed shaft mounted on the frame and carrying a crank pin, a pair of reciprocably mounted files supported upon said frame, means operated by the shaft for causing the reciprocation of the files, and means for giving a step by step rotation to the saw being filed, comprising a longitudinally slotted yoke, slidably mounted on the crank pin, a rod extending from said yoke above the files, a pawl carrying member adjustably mounted on the rod and having a pawl engaging with the saw teeth, a spring urging the rod rearward, and a collar limiting the rearward movement of the rod, said collar being adjustable.

15. A machine for filing circular saws comprising a supporting frame, a shaft mounted on the frame and carrying a crank pin, a pair of reciprocably mounted files supported upon said frame, means operated by the shaft for causing the reciprocation of the files, and means for giving a step by step rotation to the saw being filed, comprising a longitudinally slotted yoke, slidably mounted on the crank pin, a rod extending from the yoke and screw-threaded at its forward end, a fixed guide through which the rod passes, a pawl carrying block having screw-threaded engagement with the forward end of the rod and adjustable longitudinally upon the rod and having a kerf to receive the saw blade, a collar mounted on the rod rearward of the guide, a spring between the guide and the collar urging the rod rearward, and an adjustable collar limiting the rearward movement of the rod.

16. A machine for filing circular saws comprising a supporting frame, a shaft mounted on the frame and carrying a crank pin, a pair of reciprocably mounted files supported upon said frame, means operated by the shaft for causing the reciprocation of the files, and means for giving a step by step rotation to the saw being filed, comprising a longitudinally slotted yoke slidably mounted on the crank pin, a rod extending from the yoke and screw-threaded at its forward end, a fixed guide through which the rod passes, a pawl carrying block having screw-threaded engagement with the forward end of the rod and adjustable longitudinally upon the rod and having a kerf to receive the saw blade, an adjustable collar mounted on the rod rearward of the guide, a spring between the guide and the collar urging the rod rearward, and an adjustable collar limiting the rearward movement of the rod.

17. A machine for filing circular saws, including a base frame and a vertical frame at the rear thereof, a vertical shaft mounted in the last named frame and carrying a beveled gear and a fly wheel, a horizontal shaft mounted in the last named frame and carrying a relatively large beveled gear wheel engaging the first named beveled gear wheel, said second named beveled gear wheel having a crank pin, a pair of file carrying arms, a guide block mounted upon the base frame and having slots through which the file arms respectively pass, an oscillatable member having oppositely disposed wrist pins with which the rear ends of the file arms respectively engage, a connecting rod operatively connected to the fly wheel and to the oscillatable member to cause an oscillation of the latter upon a rotation of the former, files carried upon said file arms and disposed in crossed relation to each other, springs yieldingly urging the files toward each other and against the saw disposed between the files, a yoke having a slot relatively long in proportion to the movement of the crank pin on the gear wheel, a rod extending from said slot and screw-threaded at its forward end, a guide mounted upon the guide block and extending upward therefrom and through which said guide passes, a collar adjustably mounted upon the block and rearward of the guide, a spring disposed between the collar and the guide and urging the rod rearward, an adjustable collar mounted on the rod forward of the guide and limiting the rearward movement of the rod under the action of the spring, and a feed block having screw-threaded engagement with the forward end of the rod and kerfed to receive the saw, said guide block carrying a fixed pawl engageable with the teeth of a saw.

18. A machine for filing circular saws including a slide, a rotatable gummer file mounted on the slide, means for supporting the slide in proper relation to the saw to be filed, means for constantly rotating said file, spring operated means urging the slide forward to resiliently force the file into the gullet of the saw, and means acting intermittently to retract the slide to thereby carry the file out of the gullet of the saw.

19. A machine for filing circular saws including a slide, a rotatable gummer file mounted on the slide, means for supporting the slide in proper relation to the saw to be filed and permitting the file to move toward or from the saw, means for constantly rotating the file, spring operated means urging the slide toward the saw to thereby carry the file into the gullet of the saw, power operated means for retracting the slide, and means for adjustably limiting the degree of forward movement of the slide under the action of the spring.

20. A machine for filing circular saws including a slide, a rotatable file mounted on the slide and having beveled edges, means for supporting the slide in proper relation to the saw to be filed, means for constantly rotating said file, spring operated means urging the slide forward, means acting to reciprocate the slide to carry the file into or out of engagement with the saw, and means for holding the slide in its rearward position and the file out of engagement with the saw.

21. A machine for filing circular saws comprising a supporting frame, a head block mounted upon the frame and having longitudinally extending guide flanges, a slide mounted in said head block and engaging the guide flanges, a circular file having a beveled edge rotatably mounted on the slide, and a gear wheel operatively engaging said file to rotate it, means for reciprocating the slide in the head block, and means for rotating the file including a longitudinally extending shaft having a relatively long gear wheel thereon, with which the first named gear wheel engages, a driving shaft, and means for operatively engaging and driving the first named shaft from the second named shaft.

22. A machine for filing the interdental spaces of circular saws including a supporting frame having uprights at its forward end, a head block vertically adjustable and rotatably adjustable in said uprights, a slide mounted in said head block and carrying a rotatable circular file, a crown gear mounted on the slide and operatively engaged with the file to rotate it, a longitudinally extending shaft having a relatively long gear wheel engaging said crown gear, a horizontally disposed driving shaft mounted on the frame, means operatively engaging and driving the first named shaft from the second named shaft, and means mounted on the second named shaft for reciprocating said slide.

23. A machine for filing the interdental spaces of circular saws including a supporting frame having uprights at its forward end, a head block vertically adjustable and rotatably adjustable in said uprights, a slide mounted in said head block and carrying a rotatable circular file, a crown gear mounted on the slide and operatively engaging the file to rotate it, a longitudinally extending shaft having a relatively long gear wheel engaging said crown gear, a horizontally disposed driving shaft mounted on the frame, means operatively engaging and driving the first named shaft from the second named shaft, means mounted on the second named shaft for reciprocating said slide, and including an eccentric mounted upon the driving shaft, an eccentric rod having positive engagement with the slide upon a rearward movement of the rod, and a spring urging the slide forward.

24. A machine for filing the interdental spaces of circular saws including a supporting frame having uprights at its forward end, a head block vertically adjustable and rotatably adjustable in said uprights, a slide mounted in said head block and carrying a rotatable circular file, a crown gear mounted on the slide and operatively engaging the file to rotate it, a longitudinally extending shaft having a relatively long gear wheel engaging said crown gear, a horizontally disposed driving shaft mounted on the frame, means operatively engaging and driving the first named shaft from the second named shaft, means mounted on the second named shaft for reciprocating said slide, and including an eccentric mounted upon the driving shaft, an eccentric rod having positive engagement with the slide upon a rearward movement of the rod, a spring urging the slide forward, and means adjustably limiting the forward movement of the slide to correspond with the intended depth of the saw teeth.

25. A machine for filing the interdental spaces of circular saws including a slide, a rotatable file mounted on the slide, means for supporting the slide in proper relation to the saw to be filed and permitting the movement of the slide toward or from the saw, means for constantly rotating said file, means urging the slide forward to carry the file into the gullet of the saw, power operated means for reciprocating the slide against the action of said springs to positively shift the slide rearward and permit the spring to shift the slide forward, and means for causing a step by step retractile movement of the slide with relation to the supporting means, said last named means being shiftable into or out of operative position.

26. A machine for filing the interdental spaces of circular saws including a slide, a head block upon which the slide is supported for longitudinal movement, a beveled circular file mounted on the slide, means for giving a rotation to said file, resilient means urging the slide forward toward the saw being filed, reciprocating means positively engaging the slide upon a rearward movement to retract the slide, and a latch mounted on the head block and shiftable into or out of operative position, the slide being provided with ratchet teeth with which said latch engages, the latch permitting of a rearward movement of the slide, but preventing a forward movement thereof, to thereby cause a step by step retraction of the slide when the latch is forced into engagement with the teeth.

27. A machine for filing and gumming circular saws including a supporting frame having longitudinally extending bars and a vertical frame mounted on the bars at the rear end thereof, arms mounted at the forward end of the frame and extending upward and forward and designed to engage the mandrel of the saw to be filed, a saw guide mounted upon the forward end of the frame and kerfed for the reception of the saw, a horizontally disposed driving shaft mounted on the vertical frame and carrying a beveled gear wheel, a vertically disposed shaft having a beveled gear wheel engaged with the first named beveled gear wheel, a fly wheel mounted on the lower end of the shaft and having a radially disposed slot, a disk carried upon the supporting bars and fixed from rotation, an oscillatable disk mounted upon the first named disk, and antifriction elements between the said disks, the upper disk having vertically disposed wrist pins at diametrically opposite points, a bolt passing through the slot in the rear wheel, a connecting rod extending between one of said wrist pins and said bolt, a guide block detachably mounted upon the said supporting bars formed of said disks and having longitudinally extending slots disposed in upper and lower planes, saw filing arms pivotally mounted at their rear ends upon said wrist pins and mounted upon said slots and being disposed in normally convergent relation, file sockets rotatably mounted upon the ends of the arms, files detachably carried thereby, the files crossing each other above the saw guide and receiving a saw between them, means resiliently urging the file arms away from each other and the files toward each other and the saw, means whereby the files may be thrown out of engagement with the saw and held out of such engagement, a vertically disposed supporting member mounted upon the said guide block and extending upward therefrom, an apertured guide adjustably carried upon the upper end of said member, a crank pin on the beveled gear wheel, a slotted yoke through which the crank pin passes, a feed rod connected to said yoke and passing through the aperture of said guide, resilient means urging the feed rod rearward, means limiting the rearward movement of the feed rod, a pawl carrying member adjustably mounted upon the forward end of the feed rod and having a pawl adapted to engage the teeth of the saw being filed, vertically disposed standards mounted on the supporting bars, a cross bar adjustably mounted on the standards, a head block adjustably mounted on the standards beneath the cross bar and having a slotted prolongation to receive the saw, a slide mounted on the head block and carrying a rotatable gumming file, a crown gear wheel carried by the slide and driving said file, a beveled gear wheel operatively engaging the first named beveled gear wheel, a shaft extending therefrom and fastened through the cross bar and carrying an elongated beveled gear wheel engaging the crown beveled gear wheel whereby to drive the gumming file, an eccentric mounted upon the driving shaft, an eccentric ring, an eccentric rod extending from the ring, a member mounted upon the slide and having a perforation through which the eccentric rod loosely passes, means carried by the rod operatively engaging said member with the rod upon a rearward movement of the rod, a spring for urging the slide forward, a rod passing through the spring and engaging the slide, a stop adjustably mounted upon this rod, and a spring engaging the rear face of the stop and urging the rod forward.

28. A machine for filing circular saws including a supporting frame, driving mechanism carried thereby, supporting members adapted to engage the mandrel of the saw to be filed on each side of the saw and having portions disposed in angular relation to each other and in a vertical plane, said supporting members being pivotally connected to the supporting frame for angular adjustment in a vertical plane, files reciprocated by said driving mechanism, and means operated by said driving mechanism giving a step by step movement to the saw as the files are reciprocated.

29. A machine for filing circular saws including a supporting frame, a pair of converging file carrying arms, crossed files carried thereby, means for reciprocating said file carrying arms, and means for giving a step by step rotation to the saw being filed comprising a reciprocating rod formed in two sections, power operated means for engaging one of said sections for reciprocating the rod, and a saw engaging pawl mounted upon the other section for longitudinal adjustment, said last named section being pivoted to the first named section for movement from or toward the saw in the plane of the saw.

30. A machine for filing circular saws comprising a supporting frame, reciprocating file carrying arms operatively supported on the frame, driving means operatively connected to said arms to reciprocate them, and means for giving a step by step rotation to the saw being filed including a reciprocatable rod operatively connected to said driving means, and a pawl mounted upon said rod for longitudinal adjustment and adapted to engage the teeth of a saw, a portion of the rod being mounted for pivotal movement in a vertical plane, said portion carrying said pawl, whereby the pawl may be moved toward or away from the saw.

31. A machine for filing circular saws comprising a supporting frame, reciprocating file carrying arms operatively supported on the frame, driving means operatively connected to said arms to reciprocate them, and means for giving a step by step rotation to the saw being filed including a reciprocatable rod operatively connected to said driving means, and a block having screw-threaded engagement with the rod for adjustment therealong, said block being kerfed to receive the margin of the saw and carrying a pawl engaging the saw teeth.

32. A machine for filing circular saws including reciprocating file carrying arms, power operated means for reciprocating said arms, and means for giving a step by step rotation to the saw being filed including a saw tooth engaging pawl, a reciprocating rod connected to said pawl, a disk rotated by the power operated means and having a wrist pin, a slotted yoke engaged by said wrist pin and engaged with the said rod, a guide through which the rod passes, and a spring surrounding the rod bearing against the guide and urging the rod in the direction of said disk.

33. A machine for filing circular saws including reciprocating file carrying arms, power operated means for reciprocating said arms, and means for giving a step by step rotation to the saw being filed including a saw tooth engaging pawl, a reciprocating rod connected to said pawl, a disk rotated by the power operated means and having a wrist pin, a slotted yoke engaged by said wrist pin and engaged with the said rod, a guide through which the rod passes, a spring surrounding the rod bearing against the guide and urging the rod in the direction of said disk, and an adjustable stop limiting the movement of the rod in this direction.

34. A machine for filing circular saws including a slide, a rotatable file mounted on the slide, means for supporting the slide in proper relation with the saw to be filed and permitting the slide to move toward or from the saw, means for constantly rotating said file, means for reciprocating the slide, a spring urging the slide in a direction toward the saw, said slide having movement rearward independent of said reciprocating means and against the action of the spring, and means for causing the slide to have a step by step rearward movement comprising a pawl having a beveled face and mounted on said supporting means, and a rack carried by the slide and engaged by said pawl.

35. A machine for filing circular saws including a supporting frame, having upright members mounted thereon, a guide mounted upon the frame and having lateral portions, a slide guided by said lateral portions for movement toward or from the saw, said slide being formed with rack teeth on one edge, a pawl mounted upon one wall of the guide and shiftable into or out of engagement with the rack teeth, said pawl when in engagement with the rack teeth permitting a rearward movement of the pawl, but preventing a forward movement thereof, a rod extending from the slide, a spring engaging the rod and urging the slide forward, a power operated reciprocating rod having sliding operative engagement with the slide upon a forward movement of the rod but positively and operatively engaging the slide upon a rearward movement thereof to retract the slide, and means for adjusting the instant of operative engagement of the rod with said slide upon a rearward movement of the rod.

36. A saw filing machine including a supporting frame, mandrel engaging members projecting in advance of the frame and mounted upon the frame for adjustment in a vertical plane, a pair of saw engaging files mounted upon the supporting frame, power operated means for reciprocating the files, and power operated means for giving a step by step rotation to the saw being filed, comprising a reciprocating rod mounted upon the frame for vertical adjustment operatively connected to the power operated means and carrying a longitudinally adjustable pawl.

37. A saw filing machine including a supporting frame, a pair of saw engaging files mounted thereon, means mounted on the frame for reciprocating the files, manually operable means for shifting the files into or out of a position for operative engagement with the saw, and means giving a step by step rotation to the saw being filed comprising a reciprocating rod, and a pawl carried thereby, the rod having that portion thereof which carries the pawl shiftable to carry the pawl into or out of engagement with the saw.

In testimony whereof I hereunto affix my signature in the presence of two witnesses.

NATHAN A. DEAVER.

Witnesses:
A. J. NESBITT,
ROBT. PARKER.

Copies of this patent may be obtained for five cents each, by addressing the "Commissioner of Patents Washington, D. C."